United States Patent [19]

Klein

[11] Patent Number: 4,633,695
[45] Date of Patent: Jan. 6, 1987

[54] TOOL FOR THE SEPARATION OF TUBES

[75] Inventor: Werner Klein, Riegelsberg, Fed. Rep. of Germany

[73] Assignee: SKF Kugellagerfabriken GmbH, Schweinfurt, Fed. Rep. of Germany

[21] Appl. No.: 671,561

[22] Filed: Nov. 15, 1984

[30] Foreign Application Priority Data

Dec. 12, 1983 [DE] Fed. Rep. of Germany ....... 3341005

[51] Int. Cl.⁴ .................. B21B 19/00; B23B 27/06; B23P 17/00
[52] U.S. Cl. .......................................... 72/70; 72/338; 29/417; 82/58
[58] Field of Search .................................. 72/70–72, 72/338; 29/417; 82/54, 56, 47, 58

[56] References Cited

U.S. PATENT DOCUMENTS

| 2,350,535 | 6/1944 | Sarulla | 82/47 |
| 3,196,652 | 7/1965 | Meese | 72/126 |
| 3,213,725 | 10/1965 | Settembrini | 82/56 |
| 3,758,930 | 9/1973 | Frost et al. | 72/71 |
| 4,126,064 | 11/1978 | Tarrant | 72/70 |
| 4,302,958 | 12/1981 | Andriessen et al. | 72/71 |

FOREIGN PATENT DOCUMENTS

| 6891 | 2/1972 | Japan | 72/71 |
| 901393 | 7/1962 | United Kingdom | 82/54 |
| 936616 | 2/1983 | U.S.S.R. | 72/71 |

Primary Examiner—Lowell A. Larson
Attorney, Agent, or Firm—Yuter, Rosen & Dainow

[57] ABSTRACT

A work tool for the separation of tubes, wherein two deforming rollers rigidly mounted on the tool are moveably arranged tangential to the tube for separating the tube up to a remaining section by deformation without cutting. Thereafter the full separation is effected by a cutting roller movable radially toward the tube and advanced thereto by the work tool.

5 Claims, 2 Drawing Figures

TOOL FOR THE SEPARATION OF TUBES

FIELD OF THE INVENTION

This invention relates to tools for the separation of tubes, and in particular to non-cutting tools for the separation of rings from the ends of tubes.

BACKGROUND OF THE INVENTION

DE-OS No. 1477040 discloses a tool holder for holding tools for processing rotating work pieces comprised essentially of two opposed wheels or rollers between which a work piece can be processed. The tool holder disclosed in this publication is provided with separation rollers and is forced radially into a tubular work piece by means of a support. The tangential feed of the rollers results in the penetration of the material of the tube. In order to ensure a complete separation, the clear distance between the separation rollers must be smaller than the inner diameter of the tube. Conventional cutting rollers are employed for the separation of the tube, so that, especially at the end of the separation process, it is possible for small portions of the material to be radially displaced over the inner surface of the tube. The smaller this edge is, the less subsequent machining is necessary or the less material waste must be taken into account. The cutting edges of the cutting roller wear relatively rapidly, however, so that a tool replacement is necessary after a short period of time. In deforming rollers (i.e., rollers that effect displacement of the material by deformation rather than cutting) are employed instead of the cutting rollers, for example, with rounded profiles which are thereby less subject to wear, the remaining turned-back edges are larger and thereby the expense required by the necessity of further machining is increased.

The combination of cutting rollers and deforming rollers has been proposed for the solution to this problem in EPA No. 0013832. The deforming tool 40 forms a groove in which cutting roller 12 is subsequently inserted. In this arrangement the cutting roller is forced in a conventional manner into the material, the radial forces imposed by the cutting roller being opposed on the diametrically opposite side of the tube by a back-up roller (FIG. 7). The displacement roller forms a V-shaped groove or separating line which is less sharp than the edge of the cutting roller and thereby decreases the side friction of the cutting roller. The cutting roller must nevertheless perform the entire separation work, so that the wear of the cutting edge cannot consequently be minimized.

SUMMARY OF THE INVENTION

The object of the present invention is to provide a tool for the separation of tubes which can effect the separation with single feed movement, employing an uncomplicated machine having a long service life and whereby the separation of the tubes can be effected without the need for further machining.

In accordance with the invention this object is solved by the provision of a tool holder for two separation rollers, of the above type, in which the two separation rollers are deforming rollers with rounded circumferential profiles, which are moved tangentially against the tube to be severed. A cutting roller is also provided, affixed to the tool holder and adapted to be moved radially therewith toward the tube. The cutting roller has a sharp-edged circumferential profile. The deforming rollers and cutting roller are so arranged that their circumferential lines are tangential to an inner envelope circle having a diameter slightly larger than the inner diameter of the tube to be cut.

The combination of two deforming rollers and a cutting roller in the described arrangement produces a number of advantageous results. Upon the radial feed of the tool holder in the direction of the tube, the opposed deforming rollers move tangentially. Upon contact of the tube, the radial forces necessary for deformation in the tube are produced by the greatly reduced tangential force. As a consequence, an essentially minimum feeding force is necessary. The clear distance between the deforming rollers is somewhat larger than the inner diameter of the tubes, so that the deforming rollers cannot produce a complete separation of the tube. The deformation process is ended when the center point of the deforming rollers is aligned with the tube (i.e., when the line joining the axes of the deforming rollers intersects the axis of the tube). In this position the cutting roller completes the separation by means of its cutting edge, which is thereby directed purely radially against the tube. Advantageously, the wear-susceptible cutting roller is employed only for the separation of a relatively small remainder section in each separation process, so that its service life is greatly increased.

In accordance with a further feature of the invention the tool holder is freely moveable for a minimum distance in the direction of the connection line between the deforming rollers. As a result of this advantageous arrangement the tool holder can adjust itself to be automatically symmetrical to the tube. Thus, the extremely precise prealignment of the tool holder with respect to the tube is no longer necessary.

In a further example of the invention the deforming rollers and cutting roller are adjustable to different inner envelope circle diameters. Consequently, the tool holder can be used for severing tubes of many different tube diameters. The two deforming rollers are thereby, for example, mounted on holding arms whose distance from one another (perpendicular to the feed direction) is adjustable. The cutting roller is, on the other hand, adjustable in the radial direction toward the tube.

In accordance with a further feature of the invention, at least one of the side surfaces of the deforming roller extends in a radial plane with respect to the tube. As a result it is advantageously possible to produce the separation surfaces, i.e., the side surfaces of a tube section, to have substantially plane parallel surfaces without subsequent machining.

In a further example of the invention the cutting roller is axially displaceable a minimum distance from the planes of the deforming rollers against the force of a spring (i.e., the cutting roller is axially resiliently biased). The remaining sections of the tube, which are separated thereafter by the cutting roller, are thereby axially stressed, especially at the end of the deformation process. The tube section to be separated thereby removes itself from the tube and from the tool. In order to produce a flat side surface of the tube section, the cutting roller can be biased to follow this axial movement of the tube section and always engage on the side of the tube section until the final separation thereof. Moreover this axial displaceability is also of advantage at the end of the separation process as effected by the cutting roller. The edge which extends over the inner surface of the tube and remains after the separation of the tube section presses axially against the cutting roller and is turned aside, that is, the edge thereof is completely bent over inwardly, for their separation. In order to avoid damage to the cutting roller as it is being withdrawn, it can advantageously axially withdraw. A spring, which can advantageously be a plate spring, can be provided on the axis of the cutting roller, to resiliently support the cutting roller against its mounting.

BRIEF DESCRIPTION OF THE DRAWINGS

In order that the invention may be more clearly understood, it will now be disclosed in greater detail with reference to the accompanying drawings, wherein.

DETAILED DESCRIPTION OF THE PREFERRED EMBODIMENT

Figure 1:
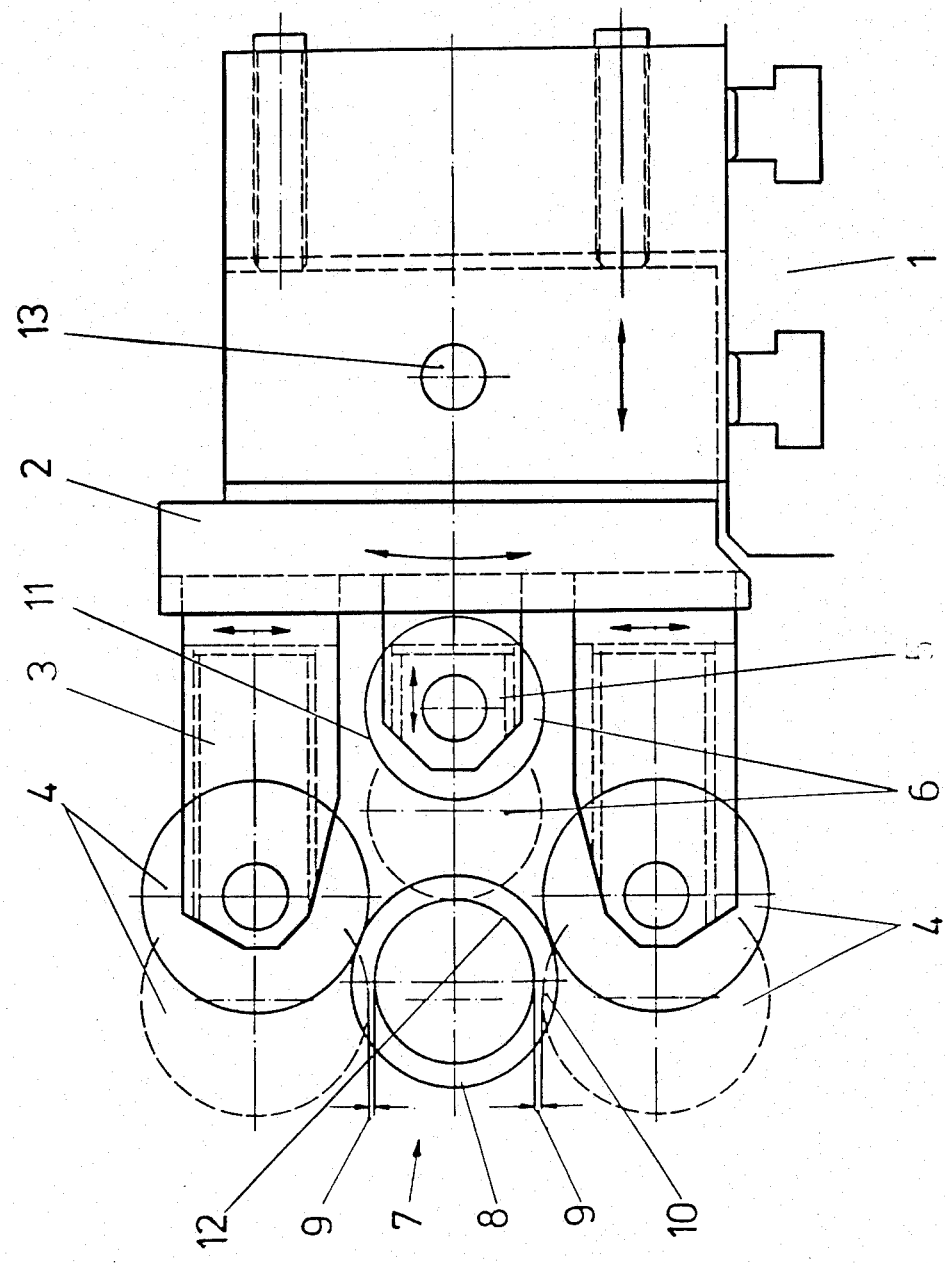
FIG. 1 is a side view of a tool in accordance with the invention, shown in solid lines before the engagement of the deforming rollers, and in dashed lines shortly after the final separation of a tube.

Referring now to the drawings, the tool illustrated in FIG. 1 is affixed to the mounting plate 1 of a support of a turning machine and is comprised essentially of a tool holder 2 with holding arms 3 for two deforming rollers 4, and a short holding arm 5 arranged therebetween for a cutting roller 6. The holding arms 3, for holding the deforming rollers 4, are displaceable for the purpose of adjustment in the direction indicated by the arrows thereon, being thereafter adaptable to be fixedly held by conventional means at the desired position. The holding arm 5 for the cutting roller 6 is fixedly connected to the tool holder 2, and has a conventional arrangement (not shown) which enables the adjustment of the cutting roller 6 in the direction of the arrow thereon. The tool as a whole is adjustable on the mounting plate 1 in the direction indicated by the arrow on the tool holder 2. The solid lines illustrate the position of the deforming rollers 4 and the cutting roller 6 just before the contact of the deforming rollers 4 with a work piece. The displacement rollers 4 directly contact a rotatably driven tube 7 on a spindle (not illustrated), for the separation, for example, of a ring 8 from the tube 7. As a result of their off-center positions, the deforming rollers 4 move tangentially of the tube 7 due to the radial infeed of the tool. The cutting roller 6 is not yet in use during this part of the operation, but is moving radially in the direction of the tube 7. When the line joining the center points of the deforming rollers 4 reaches the axis of the tube 7, the displacement process ends.

The ring 8 is now only connected to the tube 7 by an annular residual section 9. In this position the cutting roller penetrates the already formed groove 10 in the tube and cuts through the annular remaining section 9 with its cutting edge. Upon the further infeeding of the tool, the cutting roller 6 reaches the inner surface 12 of the tube 7, thereby finishing the separation process. This position is illustrated by the dashed line positions of the deforming rollers 4 and cutting roller 6 in FIG. 1. Since the tool can be symmetrically directed to the tube 7, the tool holder 2 is rotated about the axis 13 a minimum extent in the direction indicated by the arrow.

Figure 2:
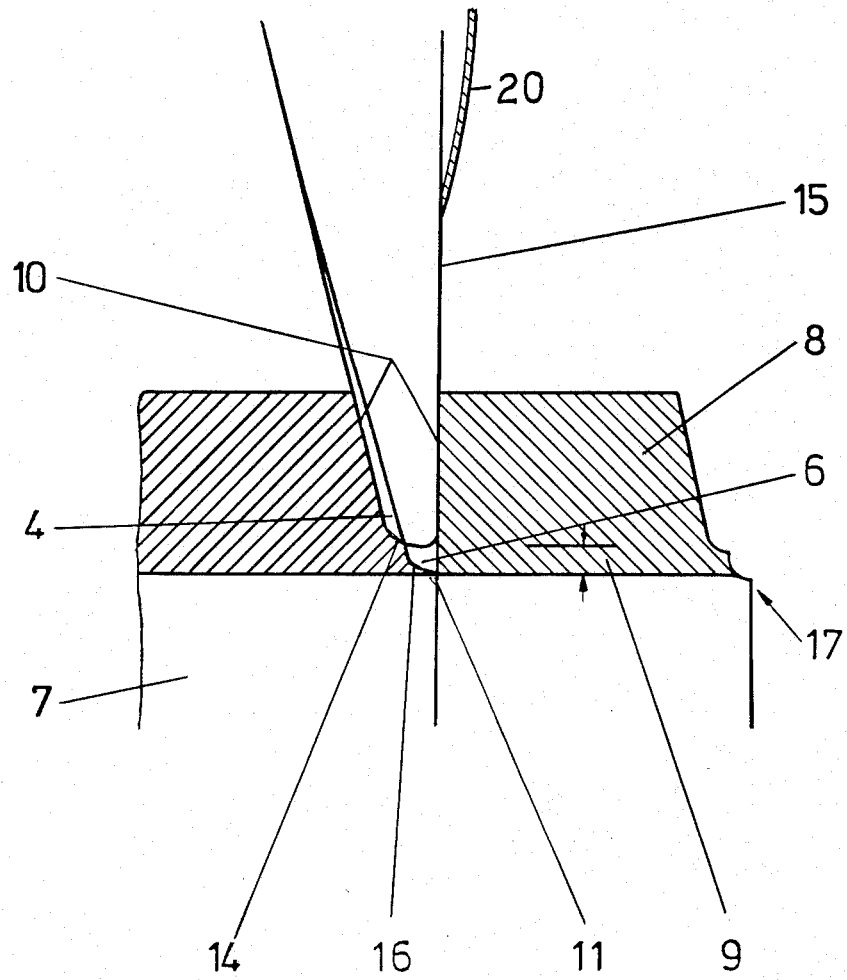
FIG. 2 is a partially cross-sectional view in the region of the separating position shortly before the final separation of a ring from the tube.

FIG. 2 illustrates the penetration of a deforming roller 4 and the cutting roller 6 in the tube 7. In order to enable a clearer understanding of the invention, the rollers 4 and 6 in FIG. 2 are illustrated superimposed on one another, although in actuality, they are angularly displaced from one another as illustrated in FIG. 1. The positions of the rollers 4 and 6 correspond to the degree of penetration of the material illustrated in dashed lines in FIG. 1. The deforming roller 4 has a rounded, substantially wedge-shaped circumferential profile 14, the side surface 15 thereof being directed toward the ring 8 to be separated, extending in a radial plane. The deforming roller 4 penetrates sufficiently deeply in the material that an annular residual section 9 remains, with the ring 8 still connected to the tube 7. The cutting roller 6 likewise has a wedge-shaped circumferential profile 16, although having a somewhat smaller or narrower and sharper edge, with the side of the cutting roller which faces toward the ring 8 likewise extending in a radial plane. As a consequence, the cutting roller 6 can enter the groove 10 formed in the tube 7 by the deforming rollers 4, without the participation of the deforming rollers 4 in the final separation process. Upon further advance of the tool, the cutting edge 11 of the cutting roller 6 fully separates the ring 8, the material thereof being radially inwardly displaced and forming a small edge 17 extending circumferentially over the inner surface 12 of the tube 7. The cutting roller 6 is, as not specifically shown in the drawings, displaceable in the direction toward ring 8 opposite the deforming rollers 4 against the force of plate spring 20, so that it can axially avoid the remaining edge 17.

While the invention has been disclosed and described with reference to a single embodiment, it is apparent that variations and modifications may be made therein, and it is therefore intended in the following claims to cover each such variation and modification as falls within the true spirit and scope of the invention.

What is claimed is:

1. A tool for the separation of tubes, having a tool holder movable substantially radially to a tube, the tool holder having mounting means for respectively supporting first and second deforming rollers adapted to separate the material of the tube by deformation without cutting, said first and second deforming roller having parallel axes in a plane extending normal to the direction of movement of the tool and being spaced from one another at a distance greater than the inner diameter but less than the outer diameter of the tube to be severed the deforming rollers having rounded circumferential profiles, said tool further comprising a cutting roller affixed to the tool holder, said cutting roller being mounted on said tool holder by way of a third mounting means arranged between said first and second mounting means and having a circumferential profile with a sharper edge than that of the deforming rollers, the deforming rollers and cutting roller being arranged during the forming and cutting operations with their respective outer circumferences being mutually tangential to a circle having a diameter slightly greater than the inner diameter of the tube to be severed.

2. The tool of claim 1 wherein the tool holder is freely moveable a minimum distance in the direction of the line interconnecting the deforming rollers.

3. The tool of claim 1 wherein the deforming rollers and cutting roller are adjustable to different circle diameters.

4. The tool of claim 1 wherein at least one of the side surfaces of the deforming rollers and cutting roller extends radially of the tube.

5. The tool of claim 1 wherein the cutting roller is axially moveable a minimum distance, against a force of a spring, from the plane of the deforming rollers.

* * * * *